UNITED STATES PATENT OFFICE.

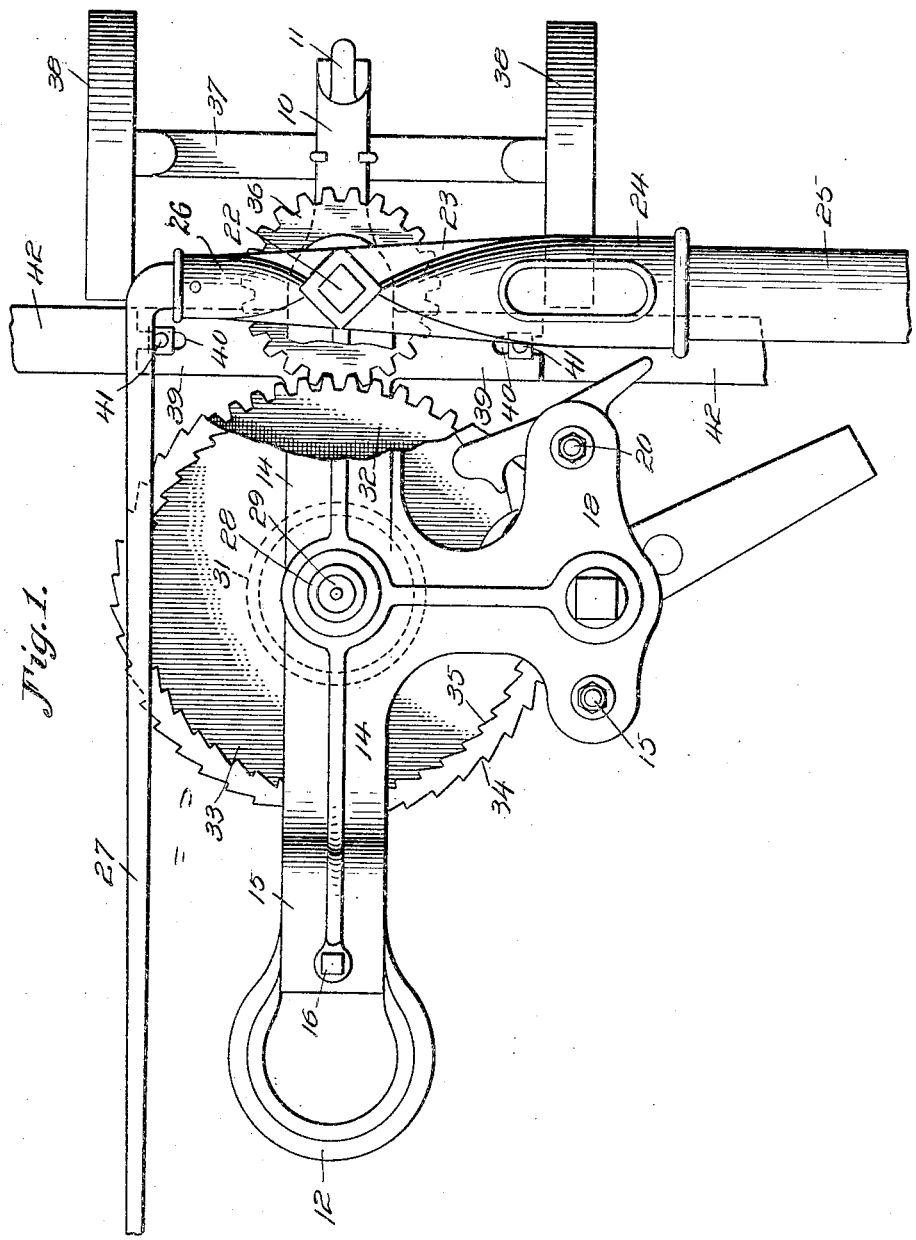

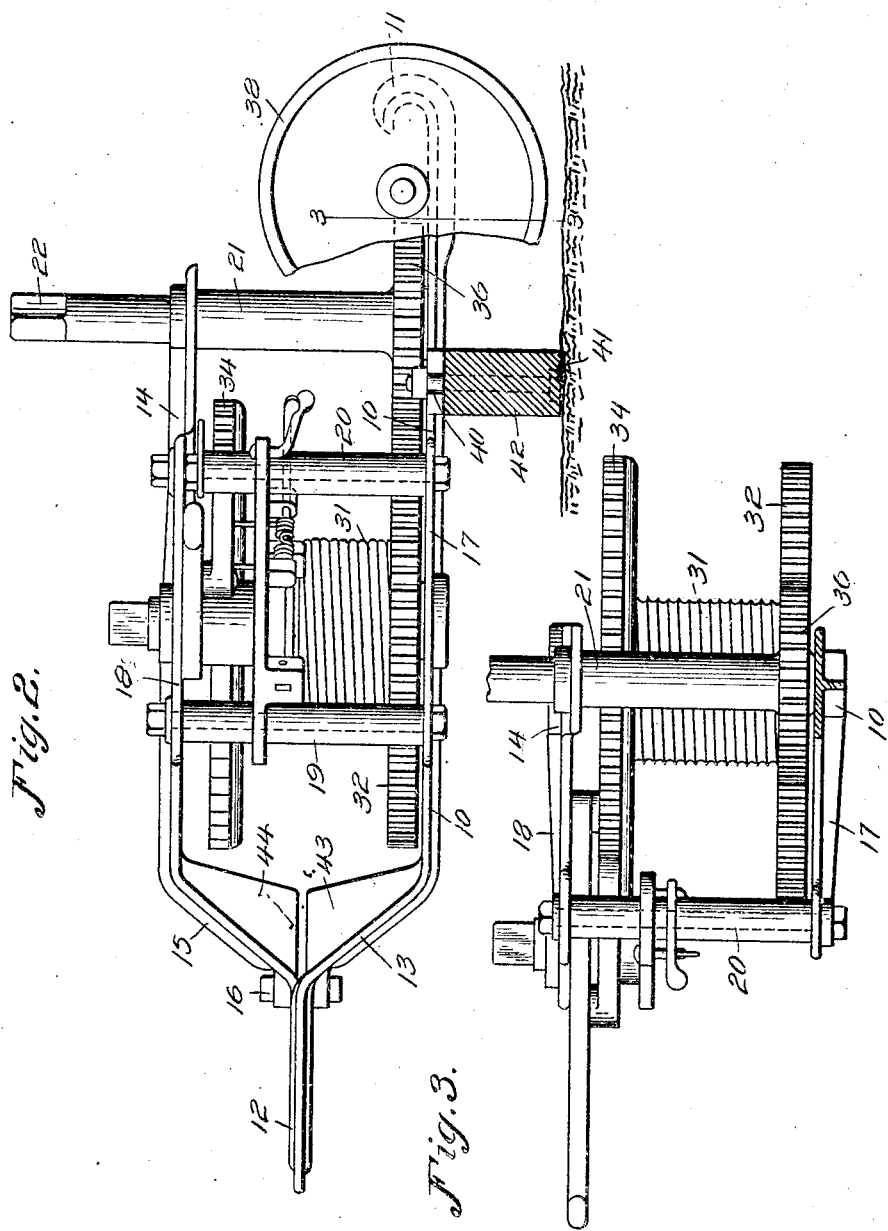

GEORGE DRAZICK, OF MILWAUKEE, WISCONSIN.

STUMP-PULLER.

1,354,473.  Specification of Letters Patent.  Patented Oct. 5, 1920.

Application filed August 28, 1919. Serial No. 320,516.

*To all whom it may concern:*

Be it known that I, GEORGE DRAZICK, a citizen of the United States, residing at Milwaukee, in the county of Milwaukee and State of Wisconsin, have invented certain new and useful Improvements in Stump-Pullers, of which the following is a specification.

This invention relates to stump pullers, and has for one of its objects to improve the construction and increase the efficiency and utility of devices of this character.

Another object of the invention is to provide a device of this character having means for preventing its overturning when in operation.

Another object of the invention is to provide a device of this character including a laterally directed bearing beam to prevent overturning, and bearing wheels which become operative when the apparatus is elevated at one end.

With these and other objects in view the invention consists in certain novel features of construction as hereafter shown and described and then specifically pointed out in the claims, and in the drawings illustrative of the preferred embodiment of the invention—

Figure 1 is a plan view with a portion broken away to illustrate the construction of certain parts more fully.

Fig. 2 is a side elevation.

Fig. 3 is a front elevation with the lower or base portion in section on the line 3—3 of Fig. 2.

The improved device includes a base member represented as a whole at 10 and having a draft hook device 11 at one end and hand grip portion 12 at the other end, the member 10 being directed upwardly near the hand grip portion, as shown at 13, to dispose the hand grip portion at a convenient distance above the ground.

The improved device likewise includes an upper member represented as a whole at 14 and directed downwardly at one end as shown at 15 and secured to the lower member 10 by a bolt or other fastening means 16.

The base member 10 is formed with a lateral extension 17, while the upper member 14 is formed with a similar lateral extension 18, the extensions being united by stay bolts or standards 19—20.

The standards 19—20 and the holding bolt 16 thus coact to support the members 10 and 14 rigidly in spaced relation.

The base 10 and upper member 14 with their extensions 17 and 18 together with the stay members 19 and 20 constitute a frame like structure to support the operating mechanism.

Extending through the member 14 at the end opposite to the inclined portion 15 and the coupling device 16, is a shaft 21, the latter stepped at its lower end in a suitable socket in the member 10.

The shaft 21 extends above the member 14 and terminates in a square head 22 to receive a suitable turning element 23, the latter having a relatively large socket 24 at one end to receive a draft pole, a portion of which is represented at 25, and a smaller socket 26 to receive a horse guiding rod 27, at the other end.

Supported in the base 10 intermediate its ends is a stud or shaft 28 formed with an upwardly opening oil receiving cavity, indicated at 29.

Mounted for rotation upon the stud 28 between the members 10 and 14, is a cable winding drum 31, and connected to or integral with the drum is a relatively large gear 32, and a disk 33 having outer ratchet teeth 34 and inner ratchet teeth 35.

The standards 19 and 20 are utilized to support a system of pawls operating in connection with the ratchets 34 and 35, but as the pawl members form no part of the present invention they are not further described.

Mounted upon the shaft 21, or integral therewith, is a pinion 36 engaging constantly with the gear 32, so that as motion is imparted to the shaft 21 by power applied to the tongue 25, the motion of the shaft 21 will be transmitted to the drum 31.

An axle 37 is rigidly coupled to the base member 10 rearwardly of the draft hook 11, and is provided with carrier wheels 38, to support the apparatus and facilitate its movement from place to place.

Extending laterally from the base member 10 near the axle 37 are projections 39 having outwardly opening slots 40 in their ends to receive clamp bolts or like devices 41 whereby a relatively long bearing beam or sill member 42 is rigidly supported transversely of the apparatus, to support the latter and prevent it from being overturned when strain is applied to the pulling cables operating around the drum 31.

The bearing wheels 38 bear upon the ground only when the apparatus is tilted upwardly at one end by lifting force applied to the hand grip 12, thus elevating the bearing beam free from the ground and supporting the apparatus by the bearing wheels only, so that it can be easily moved from place to place.

The wheels 38 are thus inoperative while the apparatus is being employed for pulling stumps, and the beam 42 is inoperative while the apparatus is being moved from place to place.

When not required, or when the apparatus is being transported for relatively long distances, the beam 42 can be readily detached by merely loosening the bolts 41.

The members 10 and 14 are preferably reinforced by reinforcing members or ribs 43 and 44.

The apparatus is constructed wholly of metal, is strong and compact, and enables stumps and the like to be pulled from the ground with the expenditure of a minimum of force, as will be obvious.

What I claim is:

1. In an apparatus of the class described, a frame device adapted to support power applying means and having lateral extensions formed with outwardly opening slots, carrier wheels mounted relatively to said frame at one end, a bearing beam beneath said extensions and directed transversely of the frame and spaced from the carrier wheels, and fastening devices operating through the slots and the bearing beam, said beam extending normally below the lines of the carrier wheels and the wheels operative only when the frame is elevated at one end.

2. In an apparatus of the class described, a frame device adapted to support power applying means and having lateral extensions formed with outwardly open slots, carrier wheels mounted relatively to said frame at one end, a detachable bearing beam carried on the lateral extensions, clamping bolts extending through the bearing beam and engaged within the slots in the extensions for detachably holding the bearing beam thereupon, said bearing beam extending normally below the lines of the carrier wheels and engaging the ground when the device is in a horizontal position, and the wheels operative only when the frame is in an inclined position or elevated at one end.

In testimony whereof, I affix my signature hereto.

GEORGE DRAZICK.